(12) United States Patent
Miller et al.

(10) Patent No.: US 12,240,624 B1
(45) Date of Patent: Mar. 4, 2025

(54) AIRCRAFT GAS TURBINE ENGINE WITH HEATED FUEL TO ASSIST COMBUSTION

(71) Applicant: General Electric Company, Schenectady, NY (US)

(72) Inventors: Brandon W. Miller, Middletown, OH (US); Daniel A. Niergarth, Norwood, OH (US); Arthur W. Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/461,651

(22) Filed: Sep. 6, 2023

(51) Int. Cl.
 *F02C 7/224* (2006.01)
 *B64D 37/34* (2006.01)
 *F02C 7/262* (2006.01)
 *F02C 9/28* (2006.01)

(52) U.S. Cl.
 CPC ............. *B64D 37/34* (2013.01); *F02C 7/224* (2013.01); *F02C 7/262* (2013.01); *F02C 9/28* (2013.01); *F05D 2220/323* (2013.01); *F05D 2240/35* (2013.01); *F05D 2270/092* (2013.01)

(58) Field of Classification Search
 CPC . B64D 37/34; F02C 7/224; F02C 7/26; F02C 7/262; F02C 9/46; F05D 2260/99; F05D 2270/092
 See application file for complete search history.

(56) References Cited

U.S. PATENT DOCUMENTS

| | | | |
|---|---|---|---|
| 5,896,740 A | 4/1999 | Shouman | |
| 8,534,039 B1 | 9/2013 | Pierson et al. | |
| 9,464,573 B2 | 10/2016 | Remy et al. | |
| 10,041,417 B2 | 8/2018 | Horikawa et al. | |
| 11,459,948 B2 | 10/2022 | Uechi et al. | |
| 11,603,796 B2 | 3/2023 | Diosady et al. | |
| 11,603,798 B1 | 3/2023 | Terwilliger et al. | |
| 2014/0238041 A1* | 8/2014 | Crothers | F02C 7/222 60/725 |
| 2016/0010493 A1* | 1/2016 | O'Dea | F23R 3/26 60/776 |
| 2020/0140115 A1* | 5/2020 | Andrews, Jr. | F02C 6/08 |
| 2021/0207500 A1 | 7/2021 | Klingels et al. | |
| 2022/0297844 A1 | 9/2022 | Mackin et al. | |
| 2022/0381185 A1* | 12/2022 | Muldoon | F02C 7/32 |

FOREIGN PATENT DOCUMENTS

| | | |
|---|---|---|
| FR | 3127269 A1 | 3/2023 |
| FR | 3130896 A1 | 6/2023 |
| FR | 3130897 A1 | 6/2023 |
| FR | 3133367 A1 | 9/2023 |
| FR | 3133368 A1 | 9/2023 |

* cited by examiner

*Primary Examiner* — Scott J Walthour
(74) *Attorney, Agent, or Firm* — Venable LLP; Edward A. Kmett; Michele V. Frank

(57) ABSTRACT

An aircraft gas turbine includes a combustor that combusts compressed air and at least one fuel flow from at least one fuel source to generate combustion gases. A fuel supply system is arranged to provide at least one of a first flow of fuel to the combustor via a first fuel supply line and a second flow of a heated fuel to the combustor via a second fuel supply line. A fuel heat exchanger is arranged within the fuel supply system to generate the heated fuel that is heated above an autoignition temperature of the fuel, and a heat source communicates with the fuel heat exchanger for generating the heated fuel.

8 Claims, 10 Drawing Sheets

AIRCRAFT GAS TURBINE ENGINE WITH HEATED FUEL TO ASSIST COMBUSTION

TECHNICAL FIELD

The present disclosure relates generally to an aircraft gas turbine engine with heated fuel to assist combustion.

BACKGROUND

Aircraft gas turbine engines may generally include a fan and a core section arranged in flow communication with one another. A combustor is arranged in the core section to generate combustion gases for driving a turbine in the core section of the aircraft gas turbine engine. During standard operations of the aircraft gas turbine engine, in some circumstances, a high altitude flameout may occur in the core section of the aircraft gas turbine engine. In this case, a high altitude relight operation may need to be conducted to relight the combustor of the aircraft gas turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
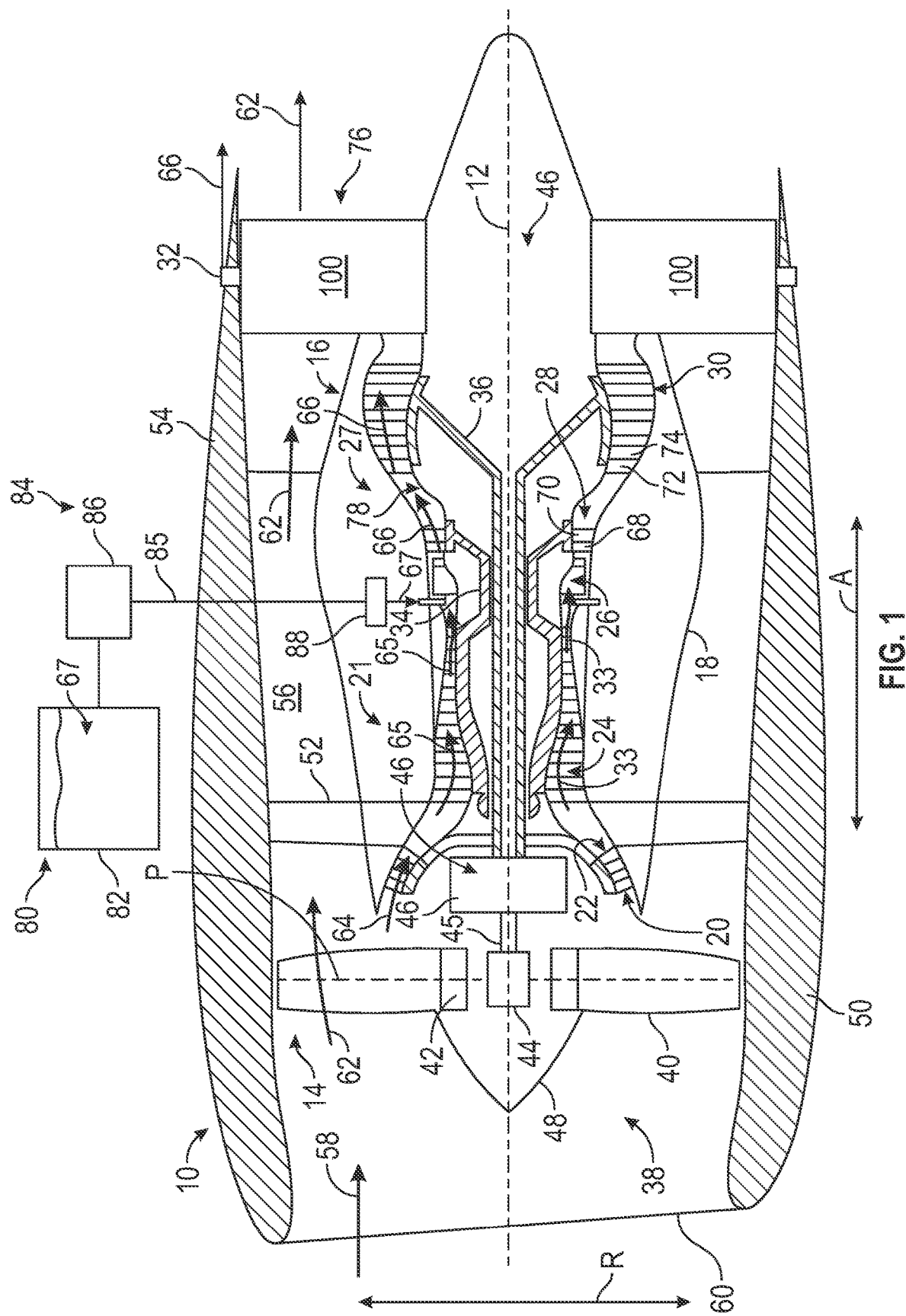
FIG. 1 is a schematic cross-sectional diagram of an aircraft gas turbine engine including a steam system, taken along a longitudinal centerline axis of the aircraft gas turbine engine, according to the present disclosure.

Features, advantages, and embodiments of the present disclosure are set forth or are apparent from a consideration of the following detailed description, drawings, and claims. Moreover, the following detailed description is exemplary and is intended to provide an explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the aircraft gas turbine engine. Moreover, the terms "radial" and "radially" refer to directions and orientations that extend substantially perpendicular to the centerline of the aircraft gas turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, in a gas turbine engine installed on an aircraft, a combustor is arranged in the core section to generate combustion gases for driving one or more turbines in a turbine section of the core section of the turbine engine. In some instances, a flameout may occur within the combustor and an emergency relight operation is needed to relight the combustor in order to prevent the aircraft from losing power. The present disclosure provides a technique for facilitating the relight operation in the aircraft turbine engine by heating fuel (generally a hydrocarbon-based fuel) to above an autoignition temperature of the fuel and injecting the heated fuel into the combustor. In this manner, the heated fuel, by virtue of being heated to above the autoignition temperature, can self-ignite within the combustor to relight the combustor, without the need for an ignitor. As a result, the relight operation is facilitated and can be performed more efficiently and more assuredly to prevent the aircraft from losing power (thrust) and to prevent a potentially catastrophic demise of the aircraft.

In the normal combustion process, not all of the energy and heat generated by the combustor is used to drive the turbine(s) of the turbine section. Instead, some waste heat is exhausted through a jet exhaust nozzle section in a conventional aircraft gas turbine engine. One aspect of an aircraft gas turbine engine discussed herein may include a steam system that is used to recover some of the energy from the waste heat by generating steam and driving a steam turbine. However, the present disclosure can be implemented in an aircraft gas turbine engine that does not include a steam system, and the aircraft gas turbine engine described herein with the steam system is merely one example of an aircraft gas turbine engine in which the present disclosure may be implemented. In the case when the steam system is implemented, the steam may also be used for various purposes, such as being injected directly into or upstream of the combustor, or may be used for heating purposes in a fuel heat exchanger. For example, a fuel heat exchanger may be implemented as a part of a fuel system in order to heat the fuel delivered to the combustor, where the steam may be provided to the fuel heat exchanger to heat the fuel. According to one aspect of the present disclosure, the fuel may be heated above the autoignition temperature of the fuel to generate heated fuel that is then delivered to the combustor. In the case when a high-altitude flameout occurs in the aircraft gas turbine engine, the heated fuel can be provided to the combustor to better assist in a relight operation of the aircraft gas turbine engine. Since the fuel is heated above the autoignition temperature, the fuel is more combustible and may be able to be spontaneously ignited without the need for an ignition source (e.g., without an ignitor), although the ignitor may also be used to ignite the heated fuel.

Referring now to the drawings, FIG. 1 is a schematic cross-sectional diagram of an aircraft gas turbine engine 10 that may be installed on an aircraft (now shown) and that includes a steam generating system 100, taken along a longitudinal centerline axis 12 (provided for reference) of the aircraft gas turbine engine 10, according to an embodiment of the present disclosure. The present disclosure relates specifically to aircraft turbine engines rather than to land-based or marine-based turbine engines since the flameout condition and the high-altitude relight operation are specific emergency scenarios of an aircraft for which the present disclosure provides a solution. The present disclosure may be implemented in any of various types of aircraft turbine engines, including high bypass turbofan engines, turbojet engines, and turboprop engines. As shown in FIG. 1, the aircraft gas turbine engine 10 has an axial direction A (extending parallel to the longitudinal centerline axis 12) and a radial direction R that is normal to the axial direction A. In general, the aircraft gas turbine engine 10 includes a fan section 14 and a core turbine engine 16 disposed downstream from the fan section 14.

The core turbine engine 16 includes an outer casing 18 that is substantially tubular and defines an annular inlet 20. As schematically shown in FIG. 1, the outer casing 18 encases, in serial flow relationship, a compressor section 21 including a booster or a low-pressure compressor (LPC) 22, followed downstream by a high-pressure compressor (HPC) 24, a combustor 26, a turbine section 27 including a high-pressure turbine (HPT) 28 followed downstream by a low-pressure turbine (LPT) 30, and one or more core exhaust nozzles 32. A high-pressure (HP) shaft 34 drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the one or more core exhaust nozzles 32 together define a core air flow path 33 therethrough.

For the embodiment depicted in FIG. 1, the fan section 14 includes a fan 38 (e.g., a variable pitch fan) having a plurality of fan blades 40 coupled to a disk 42 in a circumferentially spaced-apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears (not shown) for adjusting the rotational speed of the fan shaft 45 and, thus, adjusting the rotational speed of the fan 38 relative to the LP shaft 36.

Referring still to the exemplary embodiment of FIG. 1, the disk 42 is covered by a rotatable fan hub 48 that is aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced struts or outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In the embodiment of FIG. 1, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During a standard operating mode of the aircraft gas turbine engine 10, a volume of air 58 enters the aircraft gas turbine engine 10 through an inlet 60 of the nacelle 50 and/or the fan section 14. As the volume of air 58 passes across the fan blades 40, a first portion of air 58, shown as bypass air 62, is directed or routed into the bypass airflow passage 56, and a second portion of air 58, shown as core air 64, is directed or is routed into the upstream section of the core air flow path, or, more specifically, into the annular inlet 20 of the LPC 22. A ratio between the bypass air 62 and the core air 64 is known as a bypass ratio. The pressure of the core air 64 is then increased by the LPC 22, generating compressed air 65, and the compressed air 65 is routed through the HPC 24, where it is further compressed before being directed into the combustor 26, where the compressed air 65 is mixed with fuel 67 and burned to generate combustion gases 66 (also referred to as combustion products). One or more stages may be used in each of the LPC 22 and the HPC 24, with each subsequent stage further compressing the compressed air 65.

The combustion gases 66 are routed from the combustor 26 into the HPT 28 and expanded through the HPT 28, where a portion of thermal energy and/or kinetic energy from the combustion gases 66 is extracted via sequential stages of HPT stator vanes 68 that are coupled to the outer casing 18, and HPT rotor blades 70 that are coupled to rotors connected to the HP shaft 34, thus, causing the HP shaft 34 to rotate, thereby supporting operation of the HPC 24. The combustion gases 66 are then routed into the LPT 30 and are further expanded through the LPT 30. Here, a second portion of thermal energy and/or the kinetic energy is extracted from the combustion gases 66 via sequential stages of LPT stator vanes 72 that are coupled to the outer casing 18, and LPT rotor blades 74 that are coupled LPT rotors connected to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30.

The combustion gases 66 are subsequently routed through the one or more core exhaust nozzles 32 of the core turbine engine 16 to provide propulsive thrust. Simultaneously with the flow of the core air 64 through the core air flow path, the bypass air 62 is routed through the bypass airflow passage 56 before being exhausted from a fan bypass nozzle 76 of the aircraft gas turbine engine 10, also providing propulsive thrust. The HPT 28, the LPT 30, and the one or more core exhaust nozzles 32 at least partially define a hot gas path 78 for routing the combustion gases 66 through the core turbine engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of hydrocarbon fuel used for turbine engines, such as, for example, sustainable aviation fuels (SAF) including biofuels, Jet A, Jet A-1, or other hydrocarbon fuels. Other fuel types, which may or may not be hydrocarbon fuels, but that may generally be used in an aircraft gas turbine engine, and which have an autoignition temperature for which the fuel can be readily heated to the autoignition temperature by a heat exchanger, may also be utilized to implement the present disclosure. As used herein, an autoignition temperature is a known fuel standard for which a fuel can autoignite, but does not generally include a temperature at which a fuel may be "cracked" (e.g., does not include heating a fuel to a temperature at which an ammonia-based fuel may be heated and cracked to separate the fuel into hydrogen and nitrogen, and to then use the hydrogen as the fuel in the combustor).

The aircraft gas turbine engine 10 includes a fuel system 80 for providing the fuel 67 to the combustor 26. The fuel system 80 (which may also be referred to herein as a fuel source) includes a fuel tank 82 (which may also be referred to herein as a fuel source) for storing the fuel 67 therein, and a fuel delivery assembly 84. The fuel tank 82 can be located on an aircraft (not shown) to which the aircraft gas turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more fuel supply lines 85 configured to carry the fuel 67 from the fuel tank 82 to the combustor 26. The fuel delivery assembly 84 also includes a fuel pump 86 to induce the flow of the fuel 67 through the fuel supply lines 85 to the combustor 26. In this way, the fuel pump 86 pumps the fuel 67 from the fuel tank 82, through the fuel supply lines 85, and into the combustor 26.

The fuel system 80 may also include a fuel heat exchanger 88 in fluid communication with the fuel delivery assembly 84. As will be described in more detail below, a heat source (not shown in FIG. 1) provides heat to the fuel heat exchanger 88 so that the fuel 67 passing through the fuel heat exchanger 88 is heated to or above an autoignition temperature of the fuel 67. The fuel heat exchanger 88 is positioned in the flow path of the fuel 67 between the fuel tank 82 and the combustor 26, and may be located downstream of the fuel pump 86.

The aircraft gas turbine engine 10 includes the steam generating system 100 in fluid communication with the one or more core exhaust nozzles 32 and the fan bypass nozzle 76. The steam generating system 100 extracts steam from the combustion gases 66 as the combustion gases 66 flow through the steam generating system 100, as detailed further below.

The aircraft gas turbine engine 10 depicted in FIG. 1 is by way of example only. In other exemplary embodiments, the aircraft gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable aircraft gas turbine engine, such as, for example, turbofan engines, propfan engines, and/or turboprop engines.

Figure 2:
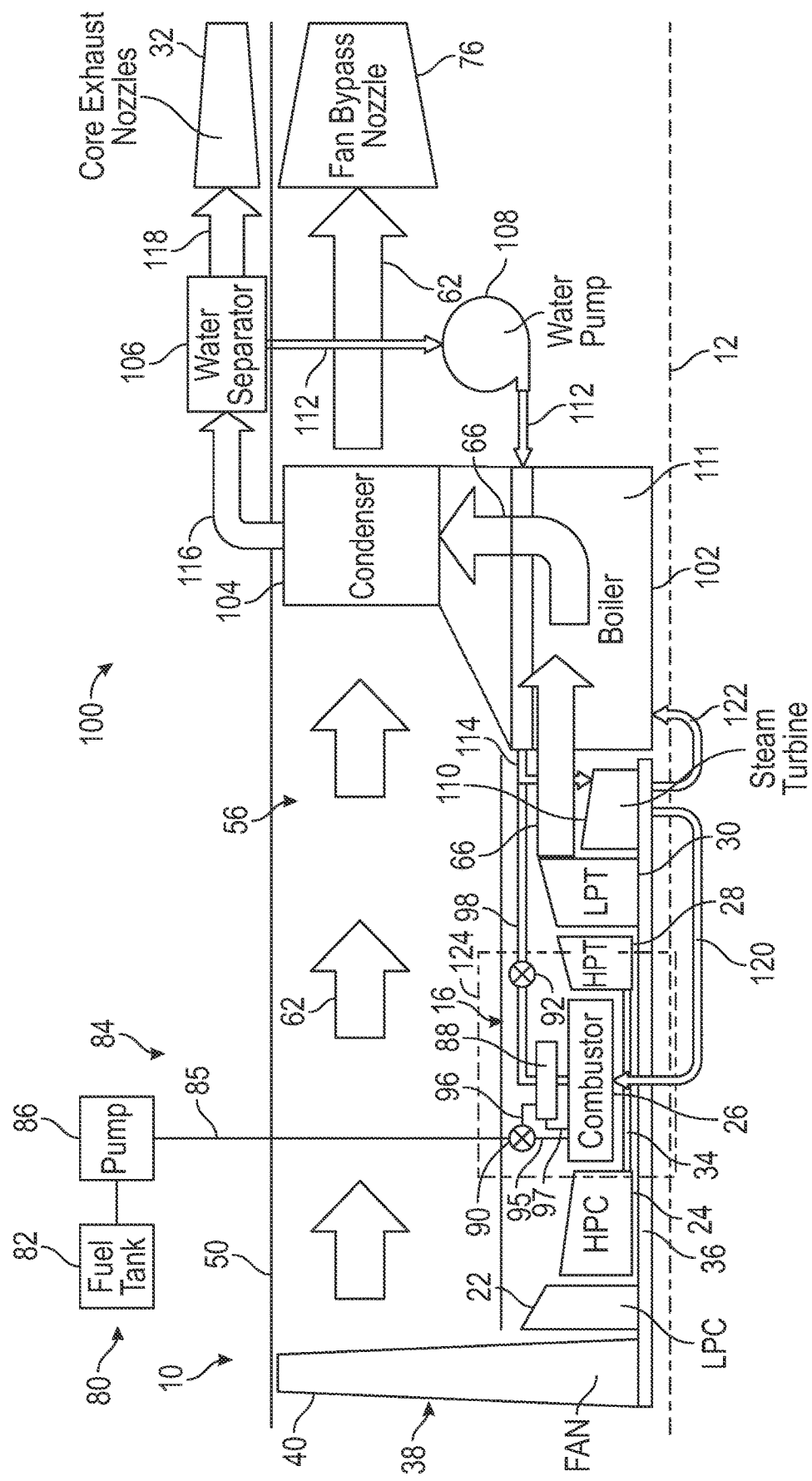
FIG. 2 is a schematic diagram of the aircraft gas turbine engine and the steam system of FIG. 1, according to the present disclosure.

FIG. 2 is a schematic diagram of the aircraft gas turbine engine 10 and the steam generating system 100 of FIG. 1, according to an aspect of the present disclosure. For clarity, the aircraft gas turbine engine 10 is shown schematically in FIG. 2 and some components are not shown in FIG. 2. The steam generating system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the aircraft gas turbine engine 10, such as, for example, radially inward of the nacelle 50, closer to the core turbine engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs separated liquid water through the boiler 102 where it is converted back to steam. This steam 114 is sent through the steam turbine 110 and then is injected into the combustor 26.

In operation, the combustion gases 66, also referred to as exhaust, flow from the LPT 30 into the boiler 102 and into the condenser 104. The combustion gases 66 transfer heat into water 111 within the boiler 102 to generate steam 114 within the boiler 102, as detailed further below. The combustion gases 66 then flow into the condenser 104, where the condenser 104 condenses the water contained within the combustion gases 66. The bypass air 62 flows through the bypass airflow passage 56 and over or through the condenser 104, and extracts heat from the combustion gases 66, cooling the combustion gases 66 and condensing the water from the combustion gases 66, to generate an exhaust-water mixture 116. The bypass air 62 is then exhausted out of the aircraft gas turbine engine 10 through the fan bypass nozzle 76 to generate thrust, as detailed above. The condenser 104 thus may be positioned in bypass airflow passage 56.

The exhaust-water mixture 116 flows into the water separator 106. The water separator 106 separates the water and the exhaust gases from the exhaust-water mixture 116 to generate separate exhaust gases 118 and water 112. The exhaust gases 118 are exhausted out of the aircraft gas turbine engine 10 through the one or more core exhaust nozzles 32 to generate thrust, as detailed above. The boiler 102, the condenser 104, and the water separator 106 thus also define a portion of the hot gas path 78 (FIG. 1) for routing the combustion gases 66, the exhaust-water mixture 116, and the exhaust gases 118 through the steam generating system 100 of the aircraft gas turbine engine 10.

The water pump 108 pumps the water 112 through one or more water lines (as indicated by the arrow for the water 112 in FIG. 2) and the water 112 flows into the boiler 102 to mix with the water 111. The water 111 flows through the boiler 102 and the combustion gases 66 flowing through the boiler 102 transfer heat into the water 111 to vaporize the water 111 and to generate the steam 114. The steam turbine 110 is coupled to the LP shaft 36, but may also be coupled to the HP shaft 34. The steam turbine 110 includes one or more stages of steam turbine blades (not shown) and steam turbine stators (not shown). The steam 114 flows from the boiler 102 into the steam turbine 110, through one or more steam lines (as indicated by the arrow for the steam 114 in FIG. 2), causing the steam turbine blades of the steam turbine 110 to rotate, thereby generating additional work in the LP shaft 36. The remaining steam (as steam 120) may then flow from the steam turbine 110, through one or more steam lines and into the combustor 26. Alternatively, the remaining steam (as steam 122) may then flow from the steam turbine 110, through one or more steam lines, back into the boiler 102.

Referring still to FIG. 2, the aircraft gas turbine engine 10 may include, as part of the fuel delivery assembly 84, a fuel diverter valve 90 that, as will be described below, may divert a flow of the fuel 67 (FIG. 1) through a fuel heat exchanger fuel supply line 96 to provide a flow of fuel to the fuel heat exchanger 88, and a heat source control valve 92 that may control heat applied to the fuel heat exchanger 88 via a heat source (described below). In FIG. 2, the heat source that is controlled by the heat source control valve 92 may be a flow of the steam 114 from the boiler 102 to be provided to the fuel heat exchanger 88.

Figure 3:
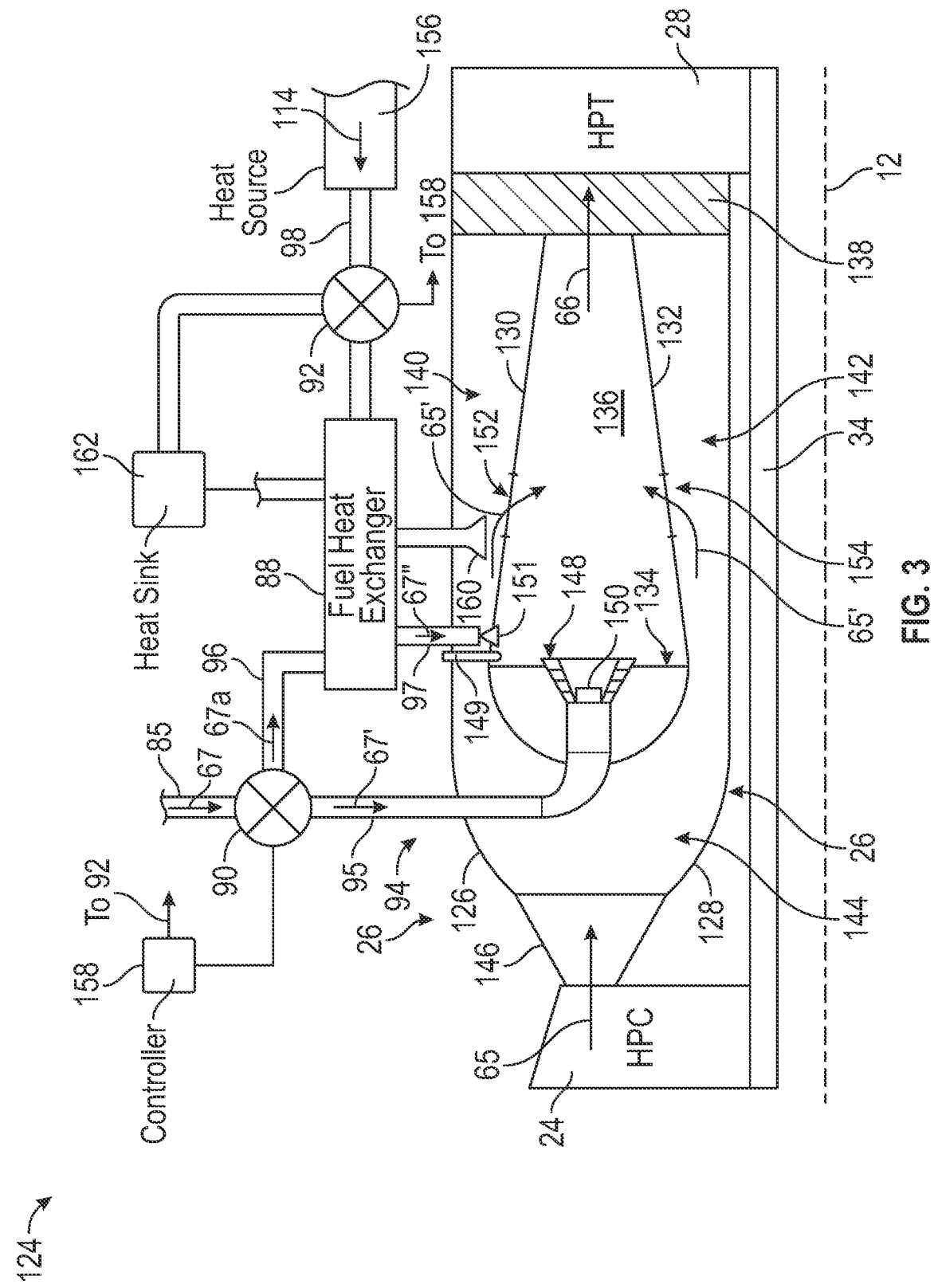
FIG. 3 is a schematic diagram of a combustor and a fuel heat exchanger, according to an aspect of the present disclosure.

FIG. 3 is a schematic diagram of a combustor and fuel heat exchanger arrangement, taken at detail view 124 of FIG. 2, according to an aspect of the present disclosure. In FIG. 3, the combustor 26 may be an annular-type combustor that extends circumferentially about the longitudinal centerline axis 12. The combustor 26 includes an outer casing 126 and an inner casing 128 that each extends circumferentially about the longitudinal centerline axis 12. An outer combustor liner 130 and an inner combustor liner 132 are connected at an upstream end via a dome assembly 134, and are connected at a downstream end to a turbine nozzle assembly 138. A combustion chamber 136 is defined between the outer combustor liner 130, the inner combustor liner 132, and the dome assembly 134. An outer flow passage 140 is formed between the outer casing 126 and the outer combustor liner 130, and an inner flow passage 142 is formed between the inner casing 128 and the inner combustor liner 132. A plenum 144 is defined at an upstream end of the combustor and a diffusor 146 provides the compressed air 65 from the high-pressure compressor 24 to the plenum 144 of the combustor 26.

A plurality of mixer assemblies 148 are arranged through the dome assembly 134, with the mixer assemblies 148 being spaced apart from one another circumferentially about the longitudinal centerline axis 12. A plurality of primary fuel nozzle assemblies 94 are constituted by respective ones of the mixer assemblies 148 being connected to a first fuel supply line 95. The first fuel supply line 95 may also be referred to as a first fuel flow path. A primary fuel nozzle 150 of each of the primary fuel nozzle assemblies 94 is connected with the first fuel supply line 95 that provides a flow of the fuel 67 to the mixer assemblies 148 to mix with the compressed air 65 so as to inject a fuel-air mixture (not shown) into the combustion chamber 136. The fuel-air mixture is then ignited by an ignitor 149 and burned within the combustion chamber 136 to generate the combustion gases 66 that flow through the turbine nozzle assembly 138 into the high-pressure turbine 28. A portion of the compressed air 65 (shown as compressed air 65') flows into the outer flow passage 140 and may flow through outer liner dilution openings 152 (shown generally between hash marks) into the combustion chamber 136, and flows into the inner flow passage 142 and may flow through inner liner dilution openings 154 (shown generally between hash marks) into the combustion chamber 136. In this way, the compressed air 65' provides quenching of the combustion gases 66 within the combustion chamber 136.

As briefly discussed above, the aircraft gas turbine engine 10 also includes a fuel heat exchanger 88. While FIG. 1 and FIG. 2 depict the fuel heat exchanger 88 being located within the core turbine engine 16, this is merely for illustrative purposes and the fuel heat exchanger 88 may be arranged at any other location in either the aircraft gas turbine engine 10, or within the aircraft. As shown in FIG.

3, the fuel diverter valve 90 is arranged in the fuel supply line 85. The fuel diverter valve 90 controls the flow of the fuel 67 to provide either a first flow of fuel 67' through the primary fuel nozzle assemblies 94 (i.e., through the first fuel supply line 95), or a second flow of fuel 67a through the fuel heat exchanger fuel supply line 96. The fuel heat exchanger fuel supply line 96 may also be referred to as a second fuel flow path. The fuel diverter valve 90 may be controlled by a controller 158 in the aircraft, and the fuel diverter valve 90 may control the flow of the fuel 67 to the combustor 26 via either or both of the primary fuel nozzle assemblies 94 or to the fuel heat exchanger 88 based on operating conditions of the aircraft gas turbine engine 10. For example, under some operating conditions (e.g., normal ground operations, cruise flight operations, and low speed landing/approach operations) of the aircraft gas turbine engine 10, the fuel diverter valve 90 may be controlled by the controller 158 to provide the first flow of fuel 67' of one hundred percent of the fuel 67 to the primary fuel nozzle assemblies 94 and zero percent of the fuel 67 to the fuel heat exchanger 88. In other operating conditions of the aircraft gas turbine engine 10 (e.g., in a high altitude relight condition), the fuel diverter valve 90 may be controlled by the controller 158 to provide zero percent of the first flow of fuel 67' to the primary fuel nozzle assemblies 94 and to provide one hundred percent of the second flow 67a to the fuel heat exchanger 88. Of course, the controller 158 may control the fuel diverter valve 90 to provide a split percentage of the fuel 67 by the fuel diverter valve 90 to both the primary fuel nozzle assembly 94 and to the fuel heat exchanger 88, such as, for example, seventy percent of the first flow of fuel 67' being provided to the primary fuel nozzle assembly 94 and thirty percent of the second flow of fuel 67a being provided to the fuel heat exchanger 88.

A secondary fuel nozzle supply line 97 provides the second flow of the heated fuel 67" from the fuel heat exchanger 88 to a plurality of secondary fuel nozzles 151. The plurality of secondary fuel nozzles 151 may be different from the primary fuel nozzles 150 in that the secondary fuel nozzles 151 may be specifically configured for injecting the heated fuel 67" into the combustion chamber 136, and may be configured so as to reduce the potential for coking due to the higher temperature of the heated fuel 67".

In FIG. 3, the aircraft gas turbine engine 10 also includes a heat source 156 that is in fluid communication with the fuel heat exchanger 88. The heat source 156 may be, as was briefly discussed above for FIG. 2, a supply of the steam 114 provided via a heat source supply line 98 from the boiler 102 to the fuel heat exchanger 88. The heat source control valve 92 may also be controlled by the controller 158 to control an amount of heat provided to the fuel heat exchanger 88 for heating the fuel 67 to generate the heated fuel 67" to be provided to the secondary fuel nozzles 151. When the fuel heat exchanger 88 is not in use, the heat source control valve 92 may divert the heat to a heat sink 162, which may constitute any one or more other component parts of the aircraft gas turbine engine 10. The heat source control valve 92 is controlled so as to provide sufficient heat to the fuel heat exchanger 88 so that the fuel 67 flowing therethrough is heated up to, or above, an autoignition temperature of the fuel 67. For example, in a case when the fuel 67 is Jet A, or Jet A-1 fuel, and the autoignition temperature of the Jet A or Jet A-1 fuel is 210° C. (410° F.), the heat source control valve 92 is controlled by the controller 158 to heat the fuel 67 to at least the foregoing autoignition temperature, and preferably, above the foregoing autoignition, temperature. Of course, other fuel types may be utilized instead, and the amount of heat provided to the fuel heat exchanger 88 for those fuel types is controlled so as to generate the heated fuel 67" that is heated to above the autoignition temperature of the respective fuel type.

In the case when the steam 114 is used as the heat source 156, in order to heat the fuel 67 to obtain the heated fuel 67", the temperature of the steam 114 would need to be above the autoignition temperature of the fuel 67. As such, the boiler 102 may be designed based on a pressure/temperature scale so as to achieve the higher temperature of the steam 114 (e.g., the boiler 102 is designed for at least nineteen (19) bar pressure to be capable of obtaining a temperature of the steam 114 of about 212.47° C.). In this manner, the heated fuel 67", upon being injected into the combustion chamber 136 via the secondary fuel nozzles 151, may automatically ignite without the need for an additional ignition source (e.g., without the ignitor 149) so that a relight of the combustor 26 may be more ready achieved. Thus, in the case when a flameout of the combustor 26 may occur, by providing the fuel 67 to the fuel heat exchanger 88 and heating the fuel 67 to generate the heated fuel 67" that is heated above the autoignition temperature, a relight of the combustor 26 may be more rapidly and more readily achieved. Of course, the heated fuel 67" may be provided to the combustor 26 in other operating conditions besides a high altitude relight condition, and, for example, may be provided to the combustor 26 upon demand for additional power.

Referring still to FIG. 3, in the case when the steam 114 is utilized as the heat source 156, the flow of the steam 114 provided to the fuel heat exchanger 88 may flow from the fuel heat exchanger 88 and be provided to the combustor 26 via a steam nozzle 160. Alternatively, the flow of the steam 114 provided to the fuel heat exchanger 88 may be provided to the heat sink 162. Moreover, while not shown in FIG. 3, the steam 114 from the fuel heat exchanger 88 may be provided back to the steam turbine 110 (FIG. 2), or may be routed back to the boiler 102 (FIG. 2).

Figure 4:
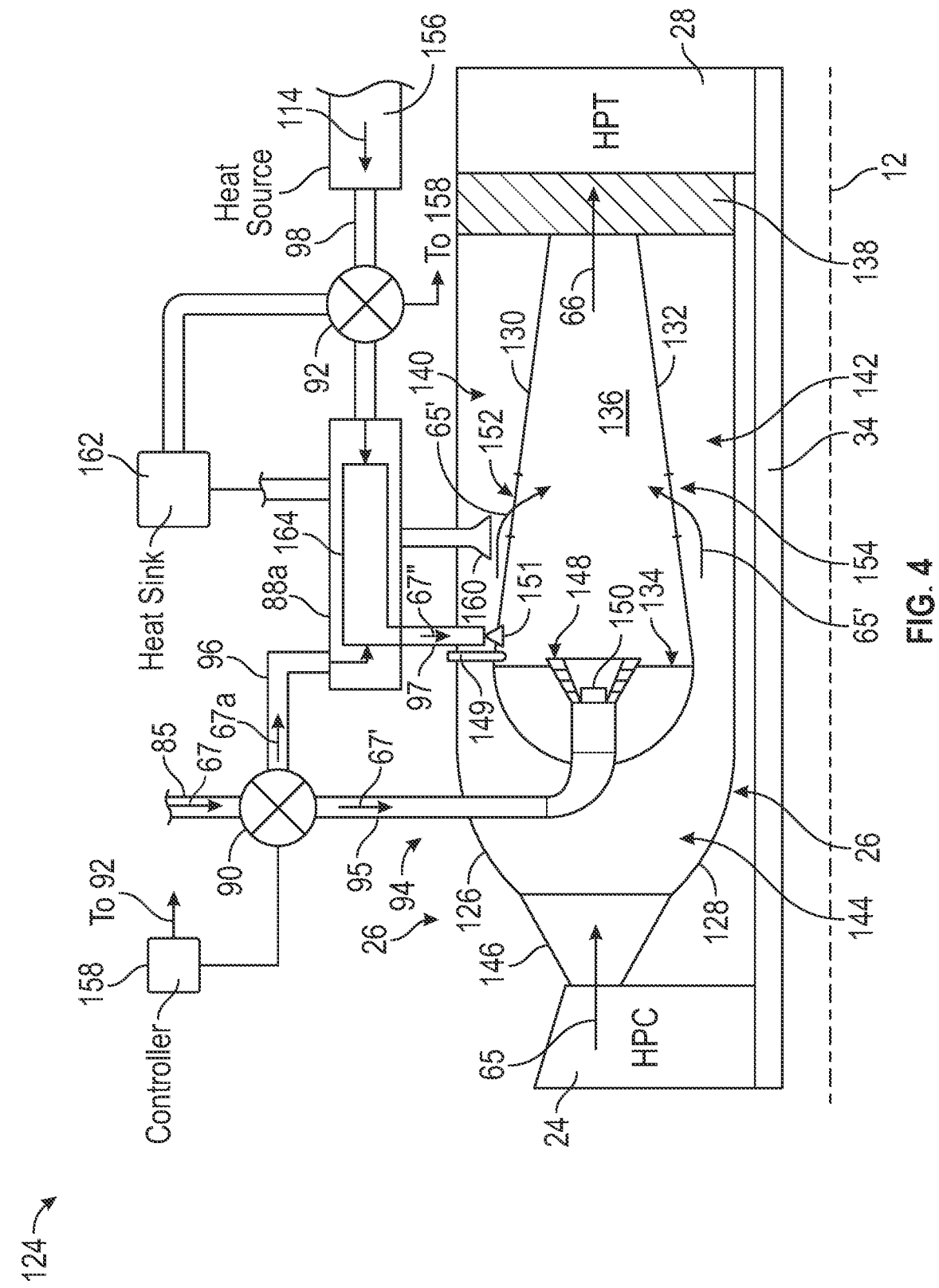
FIG. 4 is a schematic diagram of an alternate combustor and fuel heat exchanger arrangement to that shown in FIG. 3, according to yet another aspect of the present disclosure.

FIG. 4 is a schematic diagram of an alternate combustor 26 and fuel heat exchanger 88a arrangement to that shown in FIG. 3, according to another aspect of the present disclosure. In FIG. 4, elements that are the same as those of FIG. 3 have the same reference numerals and a description of those elements will not be repeated herein. In FIG. 4, the heat source 156, like the FIG. 3 aspect, constitutes the steam 114 from the boiler 102 (FIG. 2). However, in the FIG. 4 aspect, the fuel heat exchanger 88a includes a fuel-steam mixer 164. The fuel-steam mixer 164 may heat the fuel 67a by the steam 114 mixing with the fuel 67 and raising the temperature of the fuel 67 above the autoignition temperature of the fuel 67 so as to generate the heated fuel 67". In this case, the heated fuel 67" constitutes a mixture of the fuel 67 and the steam 114 that is then injected into the combustion chamber 136 via the secondary fuel nozzles 151. Similar to the FIG. 3 aspect, excess steam 114 may either be injected into the combustor 26 via the steam nozzle 160, or may be provided to the heat sink 162. In the fuel heat exchanger 88a of FIG. 4, the steam 114 may first be utilized to transfer some heat to the fuel 67 prior to mixing with the fuel 67 in the fuel-steam mixer 164. In this manner, the fuel 67 may be considered to be pre-heated within the fuel heat exchanger 88a prior to the pre-heated fuel being mixed with the steam 114 to raise the temperature of the fuel 67 to above the autoignition temperature by the mixing of the steam 114 with the fuel 67.

Figure 5:
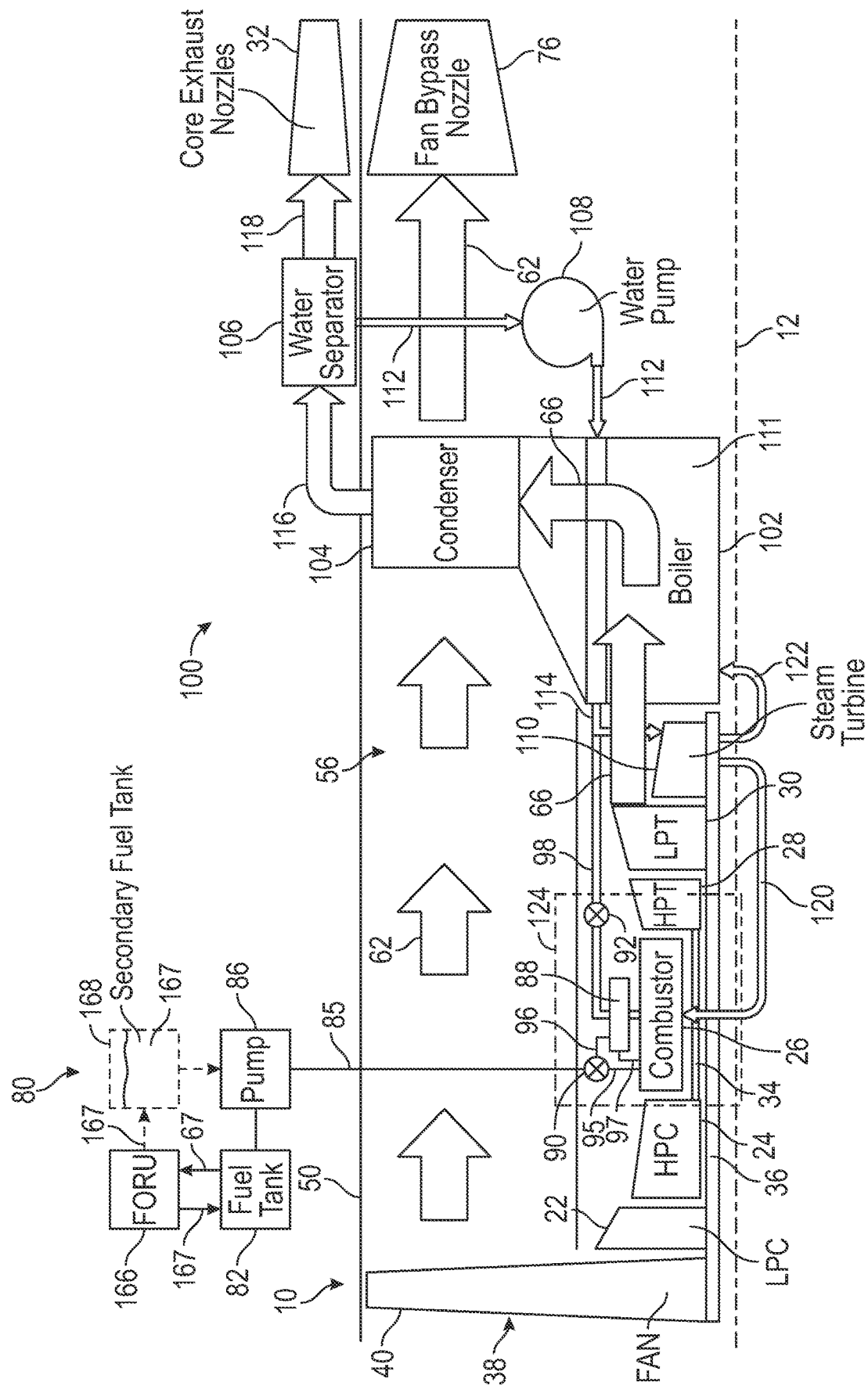
FIG. 5 is a schematic diagram of an alternate aircraft gas turbine engine and steam system to that of FIG. 2, according to yet another aspect of the present disclosure.

FIG. 5 is a schematic diagram of another alternate aircraft gas turbine engine 10 arrangement to that shown in FIG. 2, according to yet another aspect of the present disclosure. In FIG. 5, elements that are the same as those of FIG. 2 have the same reference numerals and a description of those elements will not be repeated herein. In FIG. 5, the fuel system 80 includes a fuel oxygen reduction unit (FORU) 166. The fuel 67 is provided from the fuel tank 82 to the fuel oxygen reduction unit 166, and a reduced oxygen fuel 167 may be provided back to the fuel tank 82. Alternatively, a secondary fuel tank 168 may be included to hold the reduced oxygen fuel 167, where the fuel oxygen reduction unit 166 provides the reduced oxygen fuel 167 to the secondary fuel tank 168 rather than providing the reduced oxygen fuel 167 back to the fuel tank 82. The reduced oxygen fuel 167 may then be provided via the fuel pump 86 and the fuel supply lines 85 to the fuel diverter valve 90. The remainder of the fuel system of the FIG. 5 aspect may be the same as either the FIG. 3 aspect or the FIG. 4 aspect, but provides the reduced oxygen fuel 167 to either the primary fuel nozzle assemblies 94 or to the fuel heat exchanger 88.

Figure 6:
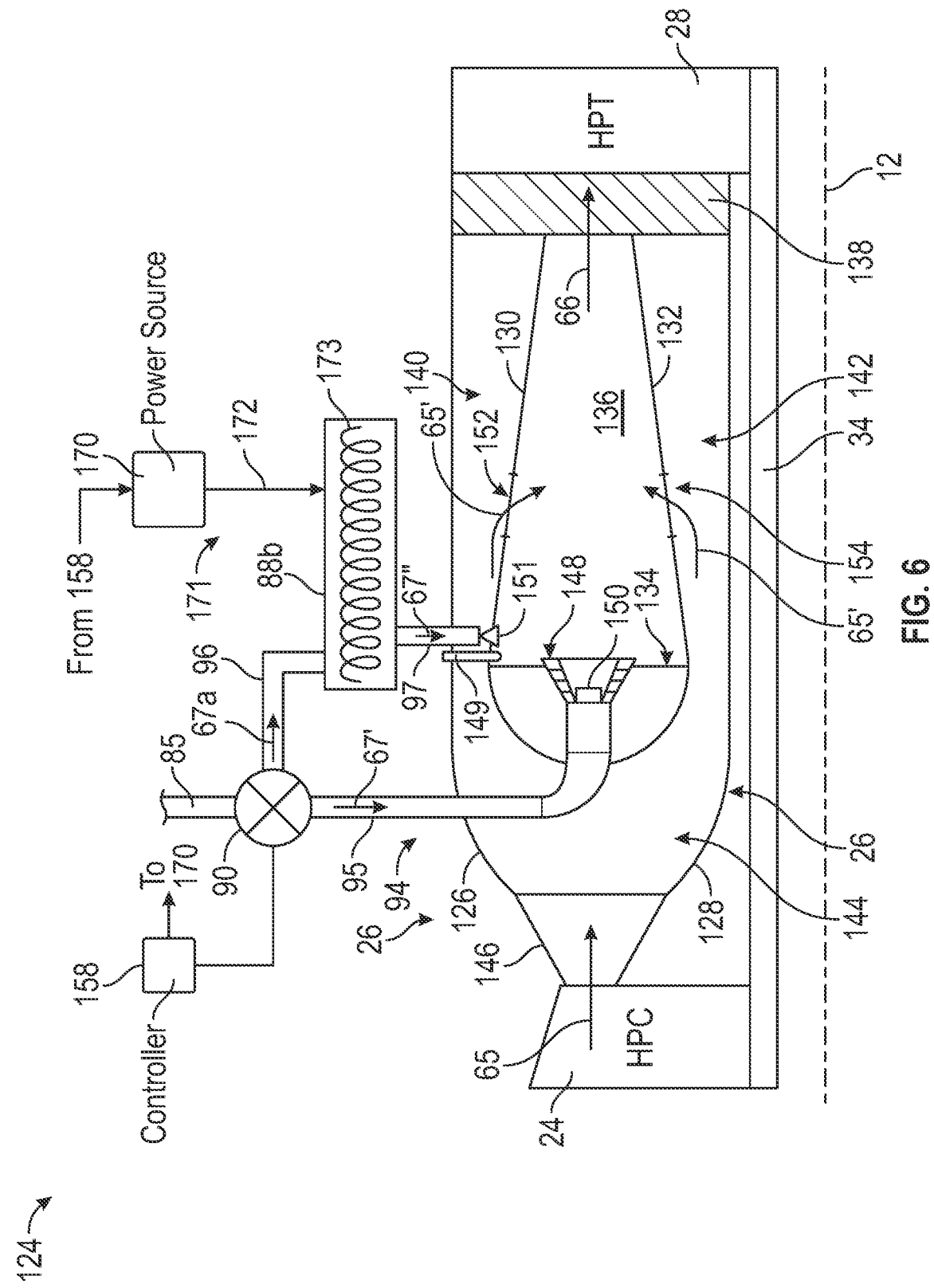
FIG. 6 is a schematic diagram of another alternate combustor and fuel heat exchanger arrangement to that shown in FIG. 3, according to yet another aspect of the present disclosure.
Figure 10:
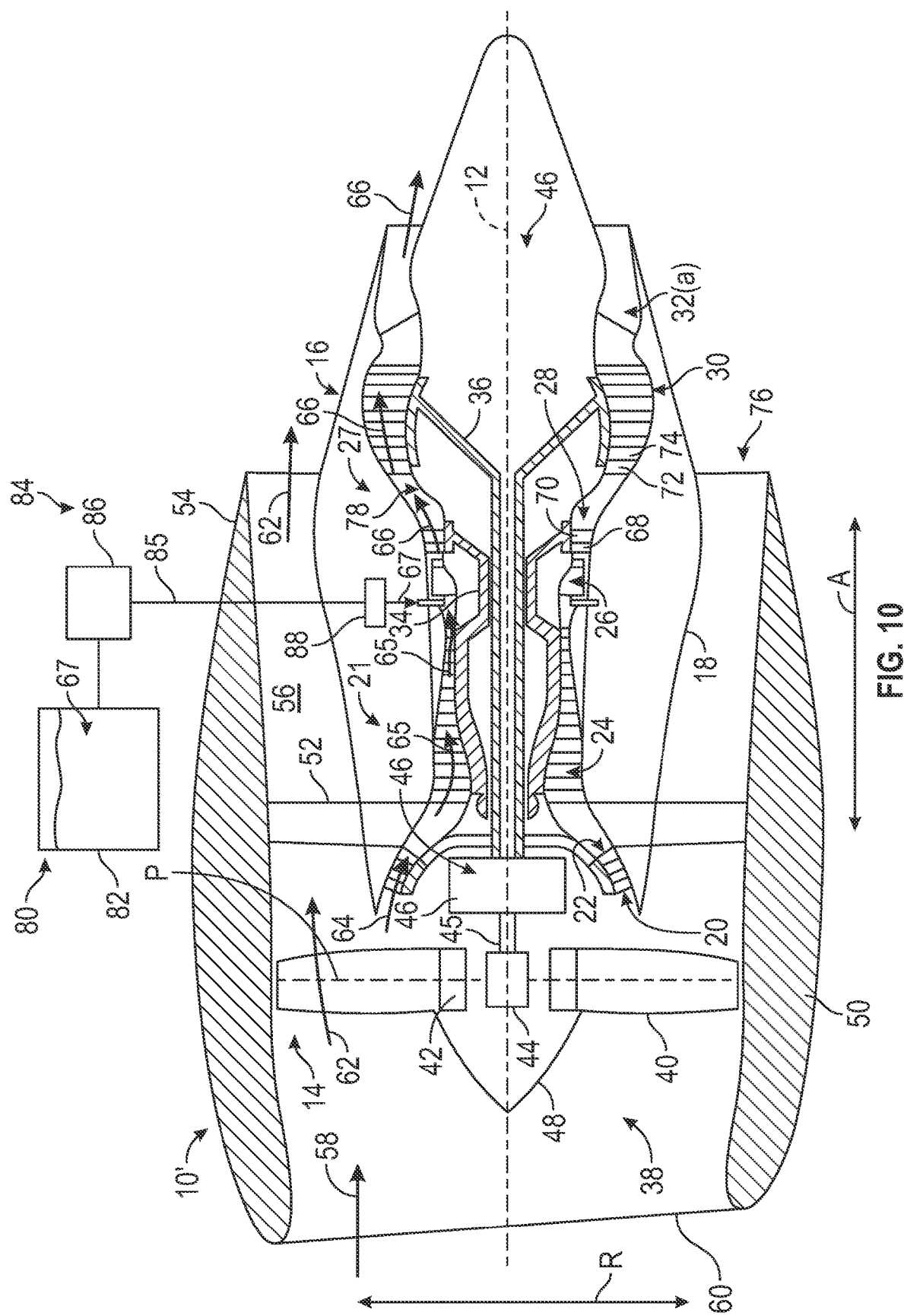
FIG. 10 is a schematic cross-sectional diagram of an alternate aircraft gas turbine engine to that depicted in FIG. 1, according to an aspect of the present disclosure.

FIG. 6 is a schematic diagram of another alternate combustor 26 and fuel heat exchanger 88b arrangement to that shown in FIG. 3, according to yet another aspect of the present disclosure. The FIG. 6 aspect of the alternate combustor 26 and fuel heat exchanger 88b arrangement may be implemented in the aircraft gas turbine engine 10 that includes the steam system 100 as depicted in FIG. 1, but, may also be implemented in a aircraft gas turbine engine that does not include the steam system 100. For example, FIG. 10 is a schematic cross-sectional diagram of an alternate aircraft gas turbine engine 10' to the aircraft gas turbine engine 10 depicted in FIG. 1. The aircraft gas turbine engine 10' is the same as the aircraft gas turbine engine 10 of FIG. 1, but omits the steam system 100. In addition, instead of the exhaust nozzles 32 extending through the nacelle 50 as shown in FIG. 1, the aircraft gas turbine engine 10' includes a core exhaust nozzle 32(a) downstream of the turbine section 27. The remaining components depicted in FIG. 10 are the same as those depicted in, and as described above, with regard to FIG. 1, and, therefore, the same elements in FIG. 10 are labeled with the same reference numerals as in FIG. 1. Accordingly, the description provided above for the FIG. 1 aspect of the same elements included in FIG. 10 is equally applicable for the FIG. 10 aspect. While FIG. 10 depicts an exemplary high bypass aircraft gas turbine engine as the alternate aircraft gas turbine engine 10', the present disclosure may also be implemented in other types of turbine engines, including turbojet engines, turboshaft engines, unducted fan turbine engines, etc.

In FIG. 6, elements that are the same as those of FIG. 3 have the same reference numerals and a description of those elements will not be repeated herein. In the FIG. 6 aspect, rather than the heat source 156 providing the steam 114 to the fuel heat exchanger 88b, a heat source 171 is implemented to provide heat to the fuel heat exchanger 88b, where the heat source 171 constitutes the fuel heat exchanger 88b including an electrical heating element 173 to provide instant heating of the fuel 67 flowing through the fuel heat exchanger 88b. More particularly, a power source 170, which may be controlled by the controller 158, provides electrical power current 172 to the electrical heating element 173 so as to heat the fuel 67 to, or above, the autoignition temperature of the fuel 67, and the fuel heat exchanger 88b then provides the heated fuel 67" to the secondary fuel nozzles 151 to provide the heated fuel 67" into the combustion chamber 136. Thus, the heat source 171 for the FIG. 6 aspect, therefore, constitutes the power source 170 and the electrical heating element 173.

Figure 7:
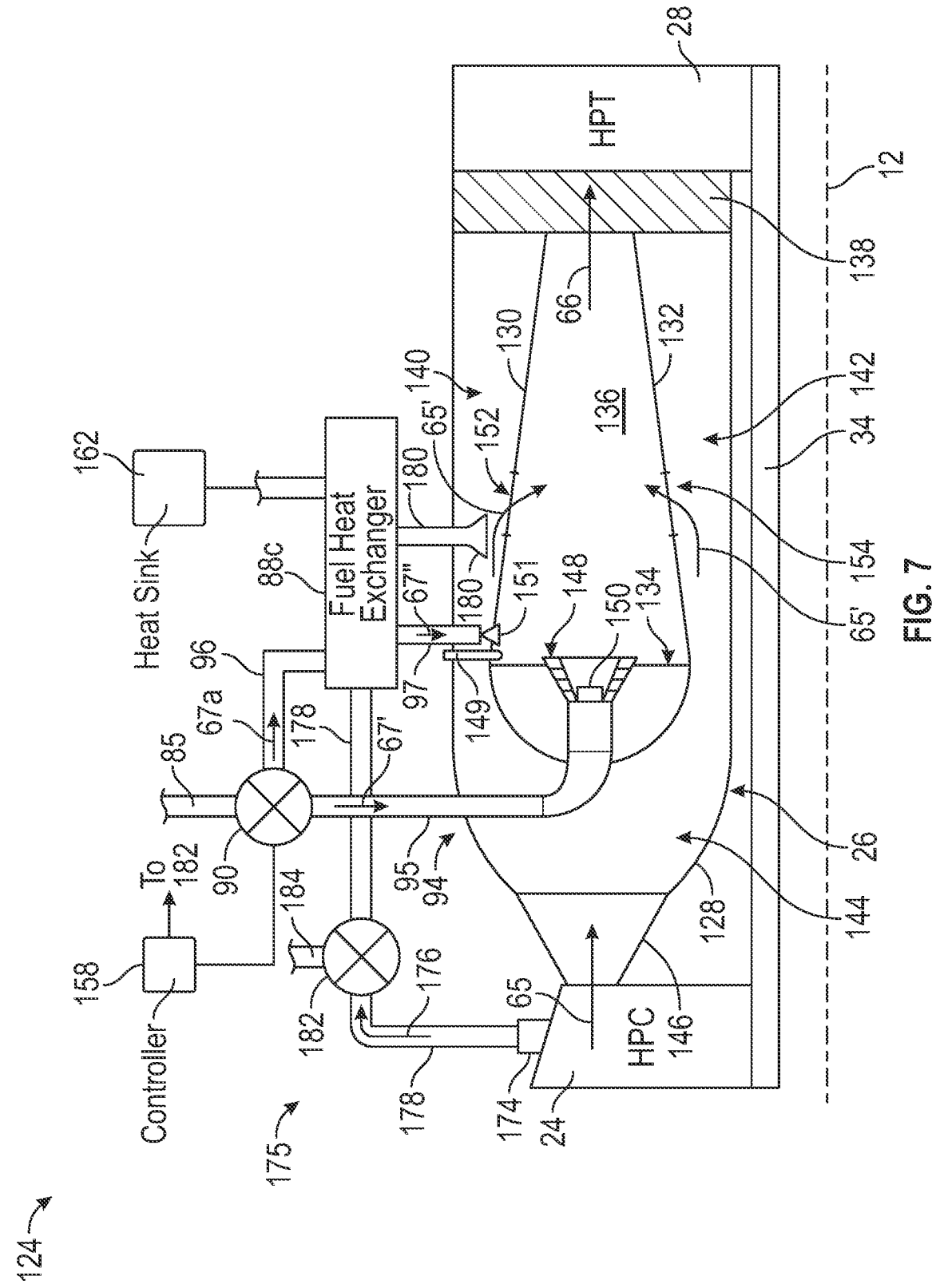
FIG. 7 is a schematic diagram of another alternate combustor and fuel heat exchanger arrangement to that shown in FIG. 2, according to yet another aspect of the present disclosure.

FIG. 7 is a schematic diagram of another alternate combustor 26 and fuel heat exchanger 88c arrangement to that shown in FIG. 3, according to yet another aspect of the present disclosure. In FIG. 7, elements that are the same as those of FIG. 3 have the same reference numerals and a description of those elements will not be repeated herein. In addition, the FIG. 7 aspect may be implemented in either the aircraft gas turbine engine 10 of the FIG. 1 aspect or the alternate aircraft gas turbine engine 10' of the FIG. 10 aspect. In FIG. 7, another alternative aspect to the heat source 156 is provided. More particularly, in the FIG. 7 aspect, a heat source 175 constitutes a compressor bleed air system that includes a compressor discharge pressure bleed air valve 174 that provides a flow of compressor bleed air 176 from the high-pressure compressor 24 via a compressor bleed air conduit 178 to the fuel heat exchanger 88c. A valve 182 may be controlled by the controller 158 to allow the compressor bleed air 176 to pass through the compressor bleed air conduit 178 to the fuel heat exchanger 88c, or via a bleed air duct 184 to other parts of the aircraft gas turbine engine 10 or the aircraft. The compressor bleed air 176 may be circulated within the fuel heat exchanger 88c to heat the fuel 67 above the autoignition temperature of the fuel 67 so as to generate the heated fuel 67". In the same manner described above for the aspect of FIG. 3, the heated fuel 67" is provided to the combustion chamber 136 via the secondary fuel nozzles 151. The compressor bleed air 176 may then be provided from the fuel heat exchanger 88c back into the combustor 26 via a bleed air return line 180, or may be provided to other parts of the aircraft gas turbine engine 10 via the heat sink 162.

Figure 8:
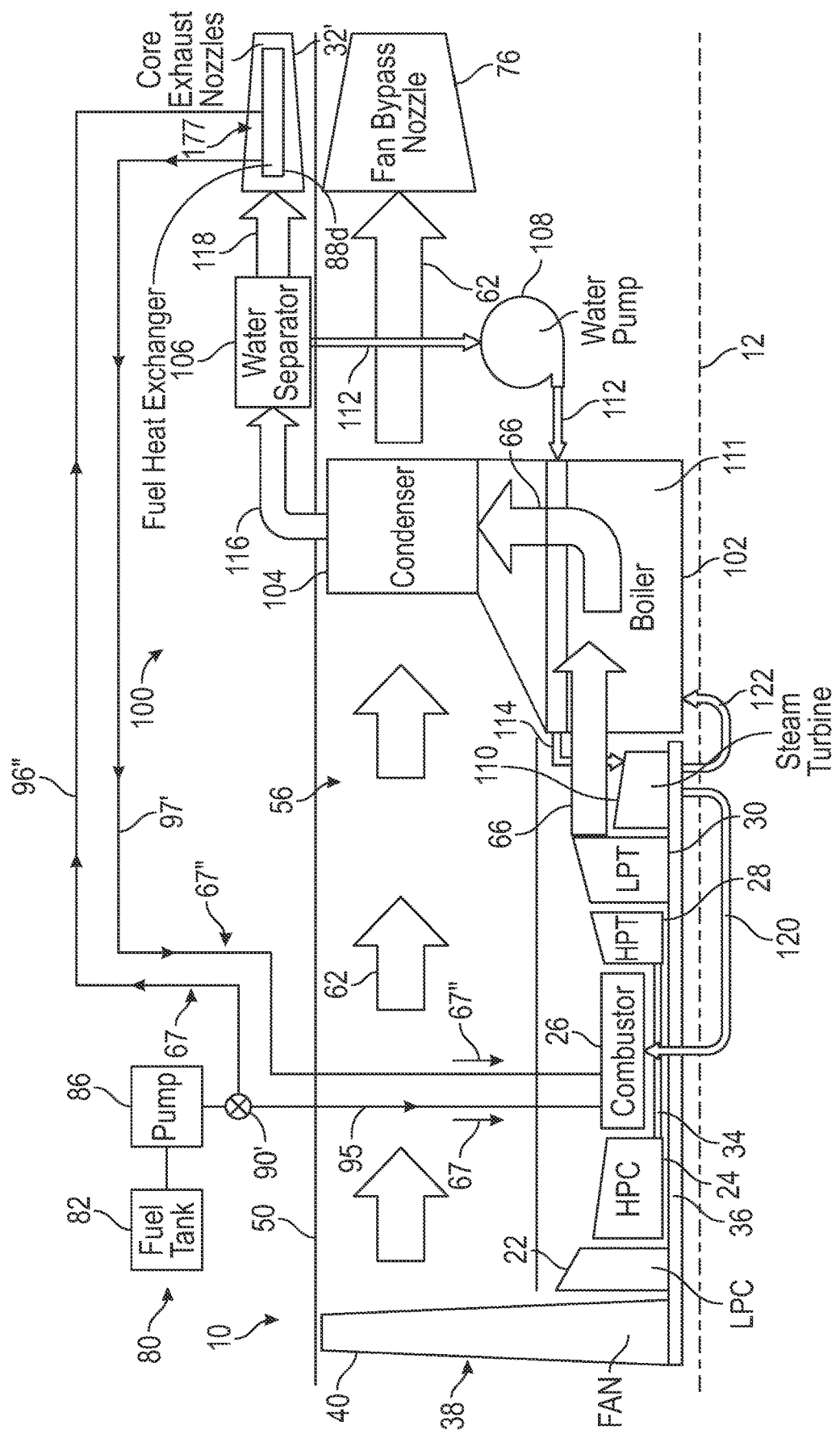
FIG. 8 is a schematic diagram of another alternate aircraft gas turbine engine and steam system to that of FIG. 2, according to yet another aspect of the present disclosure.

FIG. 8 is a schematic diagram of another alternate aircraft gas turbine engine 10 arrangement to that shown in FIG. 2, according to yet another aspect of the present disclosure. In FIG. 8, elements that are the same as those of FIG. 2 have the same reference numerals and a description of those elements will not be repeated herein. The FIG. 8 aspect may also be implemented in either the aircraft gas turbine engine 10 of the FIG. 1 aspect, or in the aircraft gas turbine engine 10' of the FIG. 10 aspect. In the FIG. 8 aspect, a fuel heat exchanger 88d is incorporated into core exhaust nozzles 32'. In the case when the FIG. 8 aspect is implemented in the FIG. 10 aspect, the fuel heat exchanger 88d may instead by incorporated into the core exhaust nozzle 32(a). Thus, in the FIG. 8 aspect, a heat source 177 constitutes a thermal transfer bus (not shown, but included as part of the core exhaust nozzles 32') where the fuel heat exchanger 88d receives the flow of fuel 67 from a fuel diverter valve 90', and the fuel 67 is heated to above the autoignition temperature of the fuel 67 by the exhaust passing through the thermal transfer bus (i.e., heat transfer passageways, not shown) within the fuel heat exchanger 88d. The heated fuel 67" is then provided to the combustor 26 via a secondary fuel nozzle supply line 97' to provide the heated fuel 67" to the secondary fuel nozzles 151 (FIG. 3).

Figure 9:
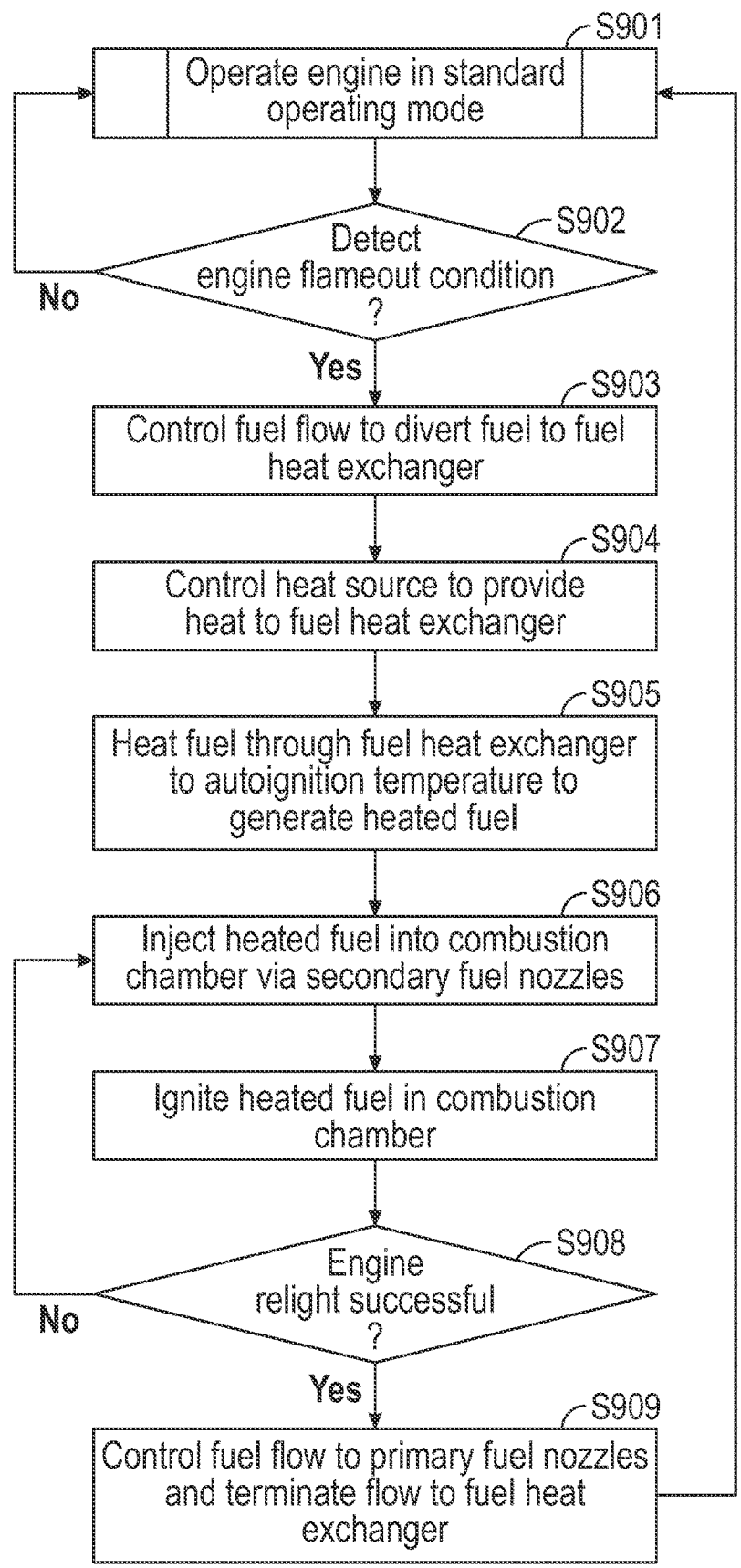
FIG. 9 is a flowchart of process steps for operating an aircraft gas turbine engine, according to an aspect of the present disclosure.

FIG. 9 is a flowchart of process steps for a method of operating an aircraft gas turbine engine, according to an aspect of the present disclosure. The process steps of FIG. 9 generally relate to performing a relight operation of the aircraft gas turbine engine 10 or of the aircraft gas turbine engine 10'. The method of FIG. 9 may be implemented in any of the aircraft gas turbine engine 10 or aircraft gas turbine engine 10' aspects described above with regard to FIG. 1 to FIG. 8. While the following description will be provided mainly with regard to the aircraft gas turbine engine 10 that includes the steam system 100, the method is generally equally applicable in the aircraft gas turbine engine 10'. That is, the method may be implemented in the aircraft gas turbine engine 10 or the aircraft gas turbine engine 10' that includes the combustor 26, and the fuel system 80 that provides the fuel 67 to the combustor 26, where the fuel system 80 includes the first fuel flow path constituting the primary fuel nozzle assemblies 94 and the second fuel flow path constituting the fuel heat exchanger fuel supply line 96 and the secondary fuel nozzles 151. In addition, the aircraft gas turbine engine 10 or the aircraft gas turbine engine 10' includes the fuel heat exchanger 88 (or any of fuel heat exchangers 88a to 88d) arranged in the second fuel flow path (i.e., in the fuel heat exchanger fuel supply line 96), and the heat source 156 that is in communication with the fuel heat exchanger 88.

In the method, in step S901, the aircraft gas turbine engine 10 is operated in a standard operating mode. The standard operating mode, as described in more detail above, provides the compressed air 65 and the fuel 67', via the first fuel flow path (i.e., via the primary fuel nozzle assemblies 94), to the combustor 26, and the compressed air 65 and the fuel 67' is ignited in the combustor 26 by the ignitor 149 to generate the combustion gases 66. The standard operating mode may be, for example, operating the aircraft gas turbine engine 10 from initial startup of the aircraft gas turbine engine 10, through ground operations (e.g., taxiing), takeoff, climb-out, and cruise flight. During cruise flight, for example, an engine flameout condition may occur to interrupt the standard operating mode, and, in step S902, the engine flameout condition is detected. If the engine flameout condition does not occur (NO in S902), then the aircraft gas turbine engine 10 continues with the standard operating mode. If the engine flameout condition is detected (YES in S902), then processes for a relight mode are performed.

In operating the aircraft gas turbine engine 10 in the relight mode, in step S903, the controller 158 controls the fuel diverter valve 90 so that at least a portion of the fuel 67 is diverted from the first fuel flow path (i.e., diverted from flowing to the primary fuel nozzle assemblies 94) to the fuel heat exchanger fuel supply line 96 (i.e., to the second fuel flow path) such that the fuel 67 flows through the fuel heat exchanger 88. As discussed above, the percentage of the fuel 67 that is diverted from the primary fuel nozzle assemblies 94 to the heat exchanger fuel supply line 96 may vary between zero percent and one hundred percent. In step S904, the controller 158 also controls the heat source 156 to provide heat to the fuel heat exchanger 88. As discussed above, the controller 158 may control the flow of the steam 114 to the fuel heat exchanger 88 (FIG. 3), or may control the electric power current 172 provided to the electric heating element 173 (FIG. 6), or may control the compressor discharge pressure bleed air 176 (FIG. 7) to heat the fuel 67 in the fuel heat exchanger 88. The fuel 67 flowing through the fuel heat exchanger 88 is thus heated in step S905 to, or above, the autoignition temperature of the fuel 67 to generate the heated fuel 67".

In step S906, as described above with regard to the aspects of FIG. 3 to FIG. 8, the heated fuel 67" is provided to the secondary fuel nozzles 151 in the combustor 26 to inject the heated fuel 67" into the combustion chamber 136. In step S907, the heated fuel 67" that is injected into the combustion chamber 136 preferably ignites automatically since the heated fuel 67" has been heated to at least the autoignition temperature of the fuel 67. As described above, however, the ignitor 149 may also be utilized to ignite the heated fuel 67" in the combustion chamber 136. In step S908, a determination is made whether or not the combustor relight operation has been successful. If not (NO in S908), then the relight mode continues by diverting the fuel 67 through the fuel heat exchanger 88 and injecting the heated fuel 67" into the combustion chamber 136. If the relight operation has been successful (YES in S908), then the controller 158 controls the fuel diverter valve 90 to provide the fuel 67 to the primary fuel nozzle assemblies 94 and to terminate the fuel flow to the fuel heat exchanger 88. The operation of the aircraft gas turbine engine 10 then returns to the standard operating mode in step S901.

Further aspects of the present disclosure are provided by the subject matter of the following clauses.

An aircraft gas turbine including a combustor positioned in a core air flow path to receive compressed air and to receive at least one fuel flow from at least one fuel source, the compressed air and the at least one fuel flow being mixed in the combustor and ignited to generate combustion gases within the combustor, a fuel delivery system arranged to provide at least one of a first flow of fuel to the combustor via a first fuel supply line and a second flow of a heated fuel to the combustor via a second fuel supply line, a fuel heat exchanger arranged within the fuel delivery system to generate the heated fuel, the heated fuel being heated in the fuel heat exchanger to at least an autoignition temperature of the fuel, and a heat source arranged in communication with the fuel heat exchanger for generating the heated fuel.

The aircraft gas turbine according to the preceding clause, wherein the heated fuel is heated by the fuel heat exchanger to above the autoignition temperature of the fuel.

The aircraft gas turbine according to any preceding clause, wherein the combustor further includes a first set of fuel nozzles connected to the first fuel supply line and a second set of fuel nozzles connected with the second fuel supply line.

The aircraft gas turbine according to any preceding clause, wherein the fuel delivery system further includes a fuel-oxygen reduction unit that generates a reduced oxygen fuel.

The aircraft gas turbine according to any preceding clause, wherein the fuel heat exchanger includes an electric heating element that generates the heated fuel, and the heat source includes an electric current provided to the electric heating element.

The aircraft gas turbine according to any preceding clause, wherein the heat source comprises either a thermal transport bus in communication with an exhaust section of the gas turbine, or a compressor bleed air system that provides a compressor discharge pressure airflow from a high pressure compressor of the gas turbine to the fuel heat exchanger.

The aircraft gas turbine according to any preceding clause, wherein the heat source is a steam generating source positioned downstream of the combustor, the steam generating source generating steam that is provided to the fuel heat exchanger to generate the heated fuel.

The aircraft gas turbine according to any preceding clause, wherein the steam generating source includes a boiler and utilizes the combustion gases generated by the combustor to generate the steam.

The aircraft gas turbine according to any preceding clause, wherein the fuel heat exchanger includes a fuel-steam mixer that mixes the steam from the steam generating source with the fuel to generate a fuel-steam mixture as the heated fuel.

The aircraft gas turbine according to any preceding clause, further comprising a controller that controls a percentage of the first flow of fuel through the first fuel supply line and controls a percentage of the second flow of fuel through the second fuel supply line.

The aircraft gas turbine according to any preceding clause, wherein the controller further controls the heat source to control an amount of heat applied to the fuel heat exchanger for heating the fuel.

The aircraft gas turbine according to any preceding clause, wherein, in a relight operation of the gas turbine, the controller controls the second flow of fuel through the second fuel supply line to be up to one hundred percent of the fuel flow through the fuel delivery system.

The aircraft gas turbine engine of any preceding clause, further including a combustor, wherein the combustor is fluidly coupled to the steam generation system to receive steam, the steam being injected into the combustor.

The aircraft gas turbine engine of any preceding clause, further wherein the boiler is located downstream of the combustor, the boiler receiving water and being fluidly connected to the combustor to receive the combustion gases and to boil the water to generate steam.

The aircraft gas turbine engine of any preceding clause, further comprising a core shaft, a turbine located in a hot gas path downstream of the combustor, and the steam turbine. The turbine located in the hot gas path downstream of the combustor receives the combustion gases and causes the turbine to rotate. The turbine is coupled to the core shaft to rotate the core shaft when the turbine rotates. The steam turbine is fluidly coupled to the boiler to receive the steam from the boiler and to cause the steam turbine to rotate, the steam turbine being coupled to the core shaft to rotate the core shaft when the steam turbine rotates.

The aircraft gas turbine engine of any preceding clause, wherein the core shaft is a low-pressure shaft and the turbine is a low-pressure turbine.

The aircraft gas turbine engine of any preceding clause, further comprising a fan including a plurality of blades and a fan shaft, the fan shaft being coupled to the low-pressure shaft to be driven by the low-pressure shaft.

The aircraft gas turbine engine of any preceding clause, further comprising a bypass airflow passage and a condenser. A first portion of air flowing into the fan flows through the bypass airflow passage as bypass air and a second portion of the air flowing into the fan flows through the core air flow path as core air. The condenser is positioned downstream of the boiler and in the bypass airflow passage for bypass air to cool the combustion gases and to condense the water from the combustion gases.

The aircraft gas turbine engine of any preceding clause, further comprising a condenser located downstream of the boiler to condense water from the combustion gases and to generate an exhaust-water mixture.

The aircraft gas turbine engine of the preceding clause, further comprising a water separator located downstream of the condenser, the water separator separating the water from the exhaust-water mixture and the water separator fluidly connected to the boiler to provide the water to the boiler.

The aircraft gas turbine engine of the preceding clause, wherein the water separator is a cyclonic separator.

The aircraft gas turbine engine of any preceding clause, wherein the boiler is fluidly coupled to the water separator.

The aircraft gas turbine engine of any preceding clause, further comprising a water pump in fluid communication with the water separator and with the boiler to direct the flow of water from the water separator into the boiler.

The aircraft gas turbine engine of any preceding clause, further comprising a high-pressure shaft, a high-pressure turbine, and a high-pressure compressor. The high-pressure turbine is positioned downstream of the combustor to receive the combustion gases and to cause the high-pressure turbine to rotate. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

A method of operating an aircraft gas turbine engine, the gas turbine engine including (a) a combustor, (b) a fuel delivery system that provides fuel to the combustor, the fuel delivery system including a first fuel flow path and a second fuel flow path, (c) a fuel heat exchanger arranged in the second fuel flow path, and (d) a heat source in communication with the fuel heat exchanger, the method including operating the aircraft gas turbine engine in a standard operating mode by providing a compressed airflow and a fuel, via the first fuel flow path, to the combustor, and igniting the compressed air and the fuel in the combustor to generate combustion gases, and in a case when the standard operating mode is interrupted due to a flameout condition, operating the aircraft gas turbine engine in a relight mode by: diverting at least a portion of the fuel from the first fuel flow path to the second fuel flow path such that the fuel flows through the fuel heat exchanger, providing heat via the heat source to the fuel heat exchanger, heating the fuel flowing through the fuel heat exchanger to a temperature above an autoignition temperature of the fuel to generate a heated fuel, providing the heated fuel to the combustor, and igniting the heated fuel in the combustor to relight the combustor.

The method according to the preceding clause, wherein the method further comprises, after the igniting the heated fuel in the combustor to relight the combustor successfully relights the combustor, discontinuing diverting at least a portion of the fuel from first fuel flow path to the second fuel flow path, and returning to standard operating mode of the aircraft gas turbine engine.

The method according to any preceding clause, wherein the gas turbine engine further includes a fuel oxygen reduction unit that generates a reduced oxygen fuel, and the reduced oxygen fuel is provided to the fuel delivery system.

The method according to any preceding clause, wherein the combustor includes a first set of fuel nozzles in fluid communication with the first fuel flow path, and a second set of fuel nozzles in fluid communication with the second fuel flow path, and the heated fuel is provided to the combustor via the second set of fuel nozzles.

The method according to any preceding clause, wherein the heat source includes a steam generating system arranged downstream of the combustor and in fluid communication with the fuel heat exchanger, and, in the providing heat via the heat source to the fuel heat exchanger, steam is provided via the steam generating system to the fuel heat exchanger.

The method according to any preceding clause, wherein the heat exchanger includes a fuel-steam mixer, and the providing heat via the heat source to the fuel heat exchanger includes mixing the steam and the fuel to generate the heated fuel.

The method according to any preceding clause, wherein the diverting comprises a controller controlling a valve to adjust a percentage of the fuel flowing in the first fuel flow path and a percentage of the fuel flowing in the second fuel flow path.

The method according to any preceding clause, wherein the providing heat is controlled by the controller to control an amount of the heating to be provided to the fuel heat exchanger so as to heat the fuel to above the autoignition temperature of the fuel.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

We claim:

1. A method of operating an aircraft gas turbine engine, the aircraft gas turbine engine including (a) a combustor, (b) a fuel delivery system that provides fuel to the combustor, the fuel delivery system including a first fuel flow path and a second fuel flow path, (c) a fuel heat exchanger arranged in the second fuel flow path, and (d) a heat source in communication with the fuel heat exchanger, the method comprising:

operating the aircraft gas turbine engine in a standard operating mode by providing a compressed airflow and a fuel, via the first fuel flow path, to the combustor, and igniting the compressed air and the fuel in the combustor to generate combustion gases; and operating the aircraft gas turbine engine in a relight mode by:

diverting at least a portion of the fuel from the first fuel flow path to the second fuel flow path such that the fuel flows through the fuel heat exchanger;

providing heat via the heat source to the fuel heat exchanger;

heating the fuel flowing through the fuel heat exchanger to a temperature above an autoignition temperature of the fuel to generate a heated fuel;

providing the heated fuel to the combustor; and igniting the heated fuel in the combustor to relight the combustor.

2. The method according to claim 1, the method further comprising, after the igniting the heated fuel in the combustor to relight the combustor discontinuing diverting the at least the portion of the fuel from the first fuel flow path to the second fuel flow path, and returning to operating the gas turbine engine in the standard operating mode.

3. The method according to claim 1, wherein the aircraft gas turbine engine further includes a fuel oxygen reduction unit that generates a reduced oxygen fuel, and the reduced oxygen fuel is provided to the fuel delivery system.

4. The method according to claim 1, wherein the combustor includes a first set of fuel nozzles in fluid communication with the first fuel flow path, and a second set of fuel nozzles in fluid communication with the second fuel flow path, and the heated fuel is provided to the combustor via the second set of fuel nozzles.

5. The method according to claim 1, wherein the heat source includes a steam generating system arranged downstream of the combustor and in fluid communication with the fuel heat exchanger, and, in the providing heat via the heat source to the fuel heat exchanger, steam is provided via the steam generating system to the fuel heat exchanger.

6. The method according to claim 5, wherein the fuel heat exchanger includes a fuel-steam mixer, and the providing heat via the heat source to the fuel heat exchanger includes mixing the steam and the fuel to generate the heated fuel.

7. The method according to claim 1, wherein the diverting comprises a controller controlling a valve to adjust a percentage of the fuel flowing in the first fuel flow path and a percentage of the fuel flowing in the second fuel flow path.

8. The method according to claim 7, wherein the providing heat is controlled by the controller to control an amount of the heating to be provided to the fuel heat exchanger so as to heat the fuel to above the autoignition temperature of the fuel.

* * * * *